US012797726B2

(12) United States Patent
Liu

(10) Patent No.: US 12,797,726 B2
(45) Date of Patent: Nov. 17, 2026

(54) VIRTUAL OBJECT CONTROL METHOD AND APPARATUS, TERMINAL, AND STORAGE MEDIUM

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 266 days.

(21) Appl. No.: 18/645,248

(22) Filed: Apr. 24, 2024

(65) Prior Publication Data

US 2024/0269554 A1 Aug. 15, 2024

Related U.S. Application Data

(63) Continuation of application No. 17/404,834, filed on Aug. 17, 2021, now Pat. No. 11,992,760, which is a (Continued)

(30) Foreign Application Priority Data

Aug. 8, 2019 (CN) ......................... 201910731032.1

(51) Int. Cl.
*A63F 13/5255* (2014.01)
*A63F 13/2145* (2014.01)
(Continued)

(52) U.S. Cl.
CPC ...... *A63F 13/5255* (2014.09); *A63F 13/2145* (2014.09); *A63F 13/837* (2014.09); (Continued)

(58) Field of Classification Search
CPC .............. A63F 13/5255; A63F 13/2145; A63F 13/837; A63F 2300/308; A63F 13/42; (Continued)

(56) References Cited

U.S. PATENT DOCUMENTS 11,779,845 B2 * 10/2023 Liu ...................... A63F 13/837 463/31
2013/0217498 A1 8/2013 Wang
(Continued)

FOREIGN PATENT DOCUMENTS

CN 108245887 A 7/2018
CN 108635858 A 10/2018
(Continued)

OTHER PUBLICATIONS

Tencent Technology, Japanese Office Action, JP Patent Application No. 2023-129246, Aug. 29, 2024, 6 pgs.
(Continued)

*Primary Examiner* — Ronald Laneau
(74) *Attorney, Agent, or Firm* — Morgan, Lewis & Bockius LLP

(57) ABSTRACT

A virtual object control method is performed at a computing device. The method includes: displaying a user interface (UI); receiving a touch operation signal corresponding to an operation control by a user of the computing device; obtaining attribute information of the touch operation signal; determining, according to a first posture of a virtual object and the attribute information, a second posture to which the virtual object is to be switched, wherein the first posture is a current posture of the virtual object in the virtual environment; and switching the virtual object from the first posture to the second posture. In the technical solutions, a virtual object is controlled to switch between different postures through different operations on the same operation
(Continued)

control, which removes the limitation that one operation control can only control switching of one posture, thereby helping to make the UI more concise and user-friendly.

20 Claims, 8 Drawing Sheets

Related U.S. Application Data continuation of application No. PCT/CN2020/100960, filed on Jul. 9, 2020.

(51) Int. Cl.
*A63F 13/837* (2014.01)
*G06F 3/04815* (2022.01)
*G06F 3/04817* (2022.01)
*G06F 3/0488* (2022.01)

(52) U.S. Cl.
CPC ...... *G06F 3/04815* (2013.01); *G06F 3/04817* (2013.01); *G06F 3/0488* (2013.01)

(58) Field of Classification Search
CPC ...... A63F 13/52; A63F 13/55; A63F 3/04883; A63F 13/23; A63F 13/40; A63F 2300/8076; G06F 3/04815; G06F 3/04817; G06F 3/0488
See application file for complete search history.

(56) References Cited

U.S. PATENT DOCUMENTS

| | | | |
|---|---|---|---|
| 2015/0153381 A1 | 6/2015 | Pollatsek | |
| 2017/0011210 A1* | 1/2017 | Cheong | A61B 5/681 |
| 2019/0392648 A1* | 12/2019 | Wang | G06T 19/006 |
| 2020/0298121 A1 | 9/2020 | Deng | |
| 2021/0286502 A1* | 9/2021 | Lemay | G06F 3/011 |
| 2021/0370171 A1* | 12/2021 | Liu | G06F 3/0488 |

FOREIGN PATENT DOCUMENTS

| | | |
|---|---|---|
| CN | 104436657 B | 11/2018 |
| CN | 108905198 A | 11/2018 |
| CN | 108970112 A | 12/2018 |
| CN | 109324739 A | 2/2019 |
| CN | 109350964 A | 2/2019 |
| CN | 109731329 A | 5/2019 |
| CN | 109847369 A | 6/2019 |
| CN | 110038297 A | 7/2019 |
| CN | 110354489 A | 10/2019 |
| EP | 0917898 B1 | 1/2007 |
| JP | 2005278957 A | 10/2005 |
| JP | 2007244693 A | 9/2007 |
| JP | 2008178600 A | 8/2008 |
| JP | 2018055418 A | 4/2018 |
| JP | 2018089119 A | 6/2018 |
| JP | 6402337 B2 | 10/2018 |
| JP | 2018164600 A | 10/2018 |

OTHER PUBLICATIONS

Tencent Technology, Korean Office Action, KR Patent Application No. 10-2021-7033511, Jul. 4, 2023, 10 pgs.
Tencent Technology, Korean Office Action, KR Patent Application No. 10-2021-7033511, May 28, 2024, 5 pgs.
Tencent Technology, Singapore Office Action, SG Patent Application No. 11202110041V, Feb. 6, 2023, 2 pgs.
Tencent Technology, ISR/WO, PCT/CN2020/100960, Oct. 16, 2020, 7 pgs.
Tencent Technology, Iprp, PCT/CN2020/100960, Feb. 8, 2022, 6 pgs.
Ah San, "Call of Duty: New Survival Competitive Mode Demo Video", 4399 Mobile Game Network, Retrieved from the Internet: https://v.4399pk.com/smzhsy/video_367813.htm, May 2019.
Yulong Kyushu, "How to Set Down in the Call of Duty Mobile Game? Can Anyone Get Down?", Call of Duty: Mobile Game, Retrieved from the Internet: https://tieba.baidu.com/p/6177292008, Jun. 2019.

* cited by examiner

VIRTUAL OBJECT CONTROL METHOD AND APPARATUS, TERMINAL, AND STORAGE MEDIUM

CROSS-REFERENCE TO RELATED APPLICATIONS

This application is a continuation application of U.S. patent application Ser. No. 17/404,834, entitled "VIRTUAL OBJECT CONTROL METHOD AND APPARATUS, TERMINAL, AND STORAGE MEDIUM" filed on Aug. 17, 2021, which is a continuation application of PCT Patent Application No. PCT/CN2020/100960, entitled "VIRTUAL OBJECT CONTROL METHOD AND APPARATUS, TERMINAL, AND STORAGE MEDIUM" filed on Jul. 9, 2020, which claims priority to Chinese Patent Application No. 201910731032.1, entitled "VIRTUAL OBJECT CONTROL METHOD AND APPARATUS, TERMINAL, AND STORAGE MEDIUM" and filed with the National Intellectual Property, PRC on Aug. 8, 2019, all of which are incorporated herein by reference in their entirety.

FIELD OF THE TECHNOLOGY

Embodiments of this application relate to the field of computer and Internet technologies, and in particular, to the control of virtual objects.

BACKGROUND OF THE DISCLOSURE

With the improvement of living standards and science and technology, there are more and more different types of games, the content of games becomes increasingly rich, and a quantity of function buttons also keeps increasing in games.

In the related art, in different game backgrounds, a user may click/tap different function buttons in a user interface (UI) to control a virtual object in a virtual environment to perform different operations, so as to generate different effects on the virtual environment or the virtual object.

But when there are too many functions involved, existing games and gaming systems often require the configuration of many buttons corresponding to these functions, resulting in an over-crowed user interface that is lack of playability and flexibility. Such games and gaming systems further suffer from monotonous postures being applied to different buttons that are located near each other, which not only is error-prone when the wrong buttons are activated but also reduce the performance of the games and gaming systems.

SUMMARY

Embodiments of this application provide a virtual object control method and apparatus, a computing device, and a storage medium, to implement switching of various postures of an operation control. The technical solutions are as follows.

According to an aspect, an embodiment of this application provides a virtual object control method performed by a computing device, the method including:

displaying a UI, the UI comprising an operation control configured to control a posture of a virtual object to switch between different postures in a virtual environment;

receiving a touch operation signal corresponding to the operation control by a user of the computing device;

obtaining attribute information of the touch operation signal;

determining, according to a first posture of the virtual object and the attribute information, a second posture to which the virtual object is to be switched, wherein the first posture is a current posture of the virtual object in the virtual environment; and switching the virtual object from the first posture to the second posture.

According to another aspect, an embodiment of this application further provides a computing device, including:

a processor, a communication interface, a memory, and a communication bus, the processor, the communication interface, and the memory communicating with each other by using the communication bus, the communication interface being an interface of a communication module;

the memory being configured to store program code, and transmit the program code to the processor, the processor being configured to call instructions of the program code in the memory to perform the virtual object control method.

According to yet another aspect, an embodiment of this application provides a non-transitory computer-readable storage medium, the storage medium being configured to store a plurality of computer programs, the computer programs, when executed by a computing device, being configured to perform the virtual object control method.

According to still yet another aspect, a computer program product is provided, the computer program product, when run on a computing device, causing the computing device to perform the virtual object control method.

In the technical solutions provided in the embodiments of this application, a virtual object is controlled to switch between different postures through different operations on the same operation control, which removes the limitation that one operation control can only control switching of one posture in the related art at present, and implements switching of a plurality of postures by using one operation control, thereby helping to make a UI more concise and more user-friendly.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1:
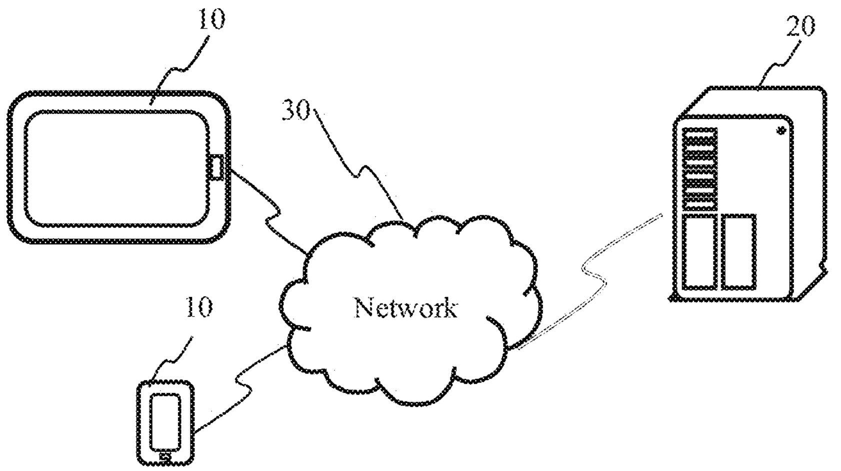
FIG. 1 is a schematic diagram of an implementation environment according to an embodiment of this application.

FIG. 1 is a schematic diagram of an implementation environment according to an embodiment of this application. The implementation environment may include a computing device (e.g., a mobile terminal 10) and a server 20.

The mobile terminal 10 may be a portable electronic device such as a mobile phone, a tablet computer, a game console, an ebook reader, a multimedia playback device, and a wearable device. A client of an application (APP) (for example, a game APP) may be installed on the mobile terminal 10.

In this embodiment of this application, the APP may be any APP that can provide a virtual environment for a virtual role that a user plays and operates to perform activities in the virtual environment. Typically, the APP may be a battle royale (BR) game, a third-person shooter (TPS) game, a first-person shooter (FPS) game, a multiplayer online battle arena (MOBA) game, a multiplayer gunfight survival game, or the like. Certainly, apart from game APPs, another type of APP can also present a virtual object to a user and provide a corresponding function to the virtual object. For example, a virtual reality (VR) APP, an augmented reality (AR) APP, a three-dimensional map APP, a military simulation program, a social APP, or an interactive entertainment APP. This is not limited in the embodiments of this application. Besides, shapes as well as corresponding functions of virtual objects provided by different APPs are different and may be preset according to actual requirements. This is not limited in the embodiments of this application.

The virtual environment is a scene displayed (or provided) when a client of an APP (for example, a game APP) runs on a computing device (e.g., a mobile terminal). The virtual environment is a scene created for a virtual object to perform activities (for example, game competition). The virtual environment may be, for example, a virtual house, a virtual island, or a virtual map. The virtual environment may be a simulated environment of the real world, may be a semi-simulated and semi-fictional environment, or may be a completely fictional environment. The virtual environment may be a two-dimensional virtual environment, a 2.5-dimensional virtual environment, or a three-dimensional virtual environment. This is not limited in the embodiments of this application.

The virtual object is a virtual role controlled by a user account in an APP. For example, the APP is a game APP. The virtual object is a game role controlled by the user account in the game APP. The virtual object may be in a human form or animal form, a cartoon form, or another form. This is not limited in the embodiments of this application. The virtual object may be presented in a three-dimensional form or a two-dimensional form. This is not limited in the embodiments of this application. In some embodiments, when the virtual environment is a three-dimensional virtual environment, the virtual object is a three-dimensional model created based on a skeletal animation technology. Each virtual object has a respective shape and size in the three-dimensional virtual environment, and occupies part of space in the three-dimensional virtual environment.

The server 20 is configured to provide a backend service to the client of the APP in the mobile terminal 10. For example, the server 20 may be a backend server of the APP. The server 20 may be one server, a server cluster including a plurality of servers, or a cloud computing service center. In some embodiments, the server 20 provides a backend service to APPs in a plurality of mobile terminals 10 at the same time.

The mobile terminal 10 and the server 20 may communicate with each other through a network 30. The network 30 may be a wired network or a wireless network.

Steps in method embodiments of this application may be performed by the mobile terminal, for example, the client of the APP run in the mobile terminal.

Figure 2:
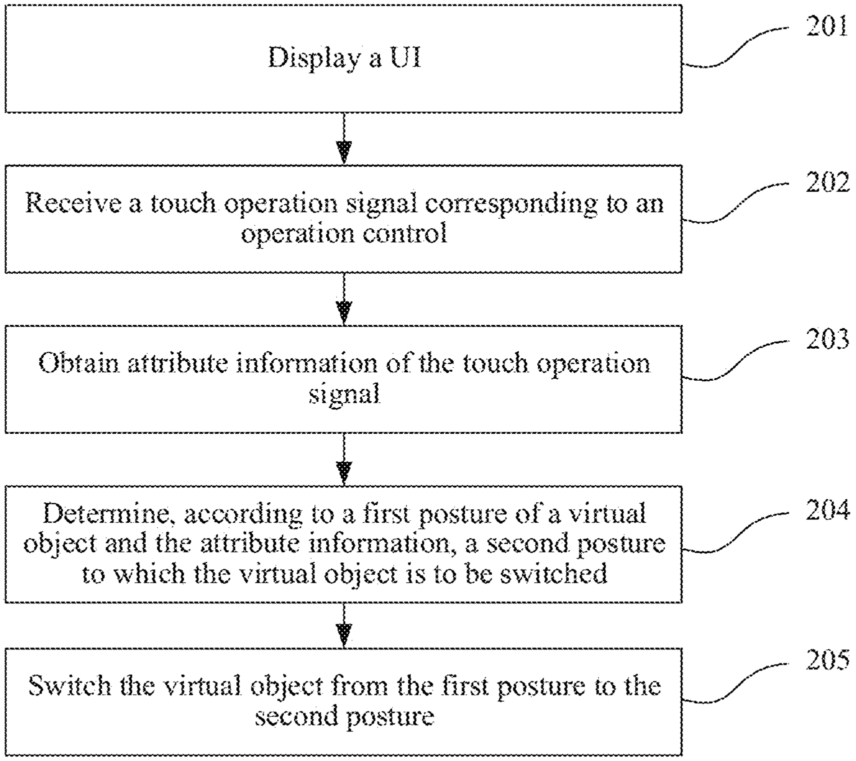
FIG. 2 is a flowchart of a virtual object control method according to an embodiment of this application.

FIG. 2 is a flowchart of a virtual object control method according to an embodiment of this application. The method may be applied to the mobile terminal 10 in the implementation environment shown in FIG. 1. For example, the steps may be performed by the client ("client" for short in the following) of the APP installed on the mobile terminal 10. The method may include the following steps (201 to 205):

Step 201: Display a UI.

A shooter game (STG) APP is used as an example. The UI may be a display interface of a game battle. The UI is configured to present a virtual environment of the game battle to a user. For example, the UI may include an element such as a virtual building, a virtual item, and a virtual object in the virtual environment. In some embodiments, the UI further includes some operation controls such as buttons, sliders, and icons for the user to operate.

In this embodiment of this application, the UI includes an operation control configured to control a posture of a virtual object in a virtual environment, and the operation control is configured to control the virtual object to switch between different postures. That is, through one operation control, the function of switching the virtual object to a plurality of different postures can be implemented.

Step 202: Receive a touch operation signal corresponding to an operation control by a user of the mobile terminal 10.

The touch operation signal is a signal generated by the user through a touch operation. For example, the user click/taps or presses the operation control to generate a touch operation signal.

Step 203: Obtain attribute information of the touch operation signal.

The attribute information is used for representing an attribute of the touch operation signal. Different touch operation signals have different types of attribute information. The attribute information includes at least one of the following: a touch duration, a touch pressure, a quantity of times of touch, and a swipe direction.

The touch duration is a duration of the touch operation signal, that is, a time difference between a start time at which the touch operation signal is detected and an end time at which the touch operation signal disappears. The touch pressure is a pressure value generated by a touch operation of the user detected by a pressure sensor. The quantity of times of touch is a quantity of times of continuously touching the operation control, for example, a quantity of times of touch corresponding to a click/tap operation is 1, a quantity of times of touch corresponding to a double-click/tap operation is 2, a quantity of times of touch corresponding to a triple-click/tap operation is 3, and the like. The swipe direction is a direction of a swipe trajectory when the touch operation signal is a swipe operation signal.

Step 204: Determine, according to a first posture of a virtual object and the attribute information, a second posture to which the virtual object is to be switched. In some embodiments, the first posture is a current posture of the virtual object in the virtual environment.

The first posture is a posture of the virtual object when the client receives a touch operation signal. The second posture is a target posture to which the virtual object is to be switched by using the touch operation signal. That is, the second posture is a posture to which the virtual object is to be switched after the client receives the touch operation signal.

In one implementation of this embodiment of this application, a posture of the virtual object is a body shape of the virtual object. For example, the posture of the virtual object includes, but is not limited to the following: a standing posture, a squatting posture, and a prone posture. The standing posture is a presentation form in which the body of the virtual object and the horizontal ground are in a vertical relationship. The squatting posture is a presentation form in which an acute angle is formed between an upper part and a lower part of the body of the virtual object with the waist as the boundary and the knees of the virtual object are bent. The prone posture may also be referred to as a get-down posture, and is a presentation form in which the body of the virtual object is close to the ground. In other possible implementations, the posture of the virtual object may further include a motion form such as a running posture and a sliding tackle posture of the virtual object.

After obtaining attribute information of the touch operation signal, the client determines, according to a first posture of the virtual object and the attribute information, a second posture to which the virtual object is to be switched. Different types of attribute information may trigger the virtual object to switch to different postures.

In some embodiments, if the first posture is a standing posture, the second posture is determined as a squatting posture when the attribute information is first attribute information; and the second posture is determined as a prone posture when the attribute information is second attribute information. If the first posture is a squatting posture, the second posture is determined as a standing posture when the attribute information is first attribute information; and the second posture is determined as a prone posture when the attribute information is second attribute information. If the first posture is a prone posture, the second posture is determined as a squatting posture when the attribute information is first attribute information; and the second posture is determined as a standing posture when the attribute information is second attribute information.

The first attribute information and the second attribute information are two different types of attribute information, and may also be referred to as mutually exclusive information. A game APP is used as an example. If the client determines a posture switching manner by using a touch duration, the first attribute information is that the touch duration is less than a preset duration, and the second attribute information is that the touch duration is greater than the preset duration; or the first attribute information is that the touch duration is greater than a preset duration, and the second attribute information is that the touch duration is less than the preset duration.

In the foregoing manner, six different functions may be implemented by using one operation control and two different operations. That is, the virtual object is controlled to switch between six different postures.

In some embodiments, if the first posture is a running posture, the second posture is determined as a sliding tackle posture. A running posture is a state in which a moving speed of the virtual object is greater than a preset speed. A sliding tackle posture is a state in which the virtual object performs a sliding tackle on the ground of the virtual environment. That is, when the first posture is a running posture, there is only one case of the second posture to which the virtual object may be switched. In some embodiments, when the first posture is a running posture, to reduce a calculation amount of a server, the client may directly switch the virtual object to a sliding tackle posture without detecting attribute information of the touch operation signal.

The standing posture, the squatting posture, and the prone posture all start and end by using corresponding operations performed by the user on corresponding operation controls. However, the sliding tackle posture lasts for a short time, and the sliding tackle posture is automatically ended and switched to another posture such as a standing posture within a particular time range. In some embodiments, the time range may be 5 s, 6 s, or 7 s. This is not limited in the embodiments of this application.

For example, an example in which the client determines a posture switching manner of the virtual object according to the touch duration in the touch operation signal is used. It is assumed that the first attribute information is that the touch duration is less than the preset duration (that is, a short press), and the second attribute information is that the touch duration is greater than the preset duration (that is, a long press). A posture switching analysis of the operation control is shown in the following Table 1:

TABLE 1

Posture switching analysis

| | Standing | Sliding tackle | Squatting | Getting down |
|---|---|---|---|---|
| Standing | Untriggerable | Untriggerable | Short press | Long press |
| Running | Untriggerable | Click/tap | Untriggerable | Untriggerable |
| squatting | Short press | Untriggerable | Untriggerable | Long press |
| Getting down | Long press | Untriggerable | Short press | Untriggerable |

In the foregoing Table 1, standing (a standing posture), squatting (a squatting posture), and getting down (a prone posture) may be switched randomly according to different touch durations. However, from the running posture, the user can only switch to the sliding tackle posture. The switching between the standing posture and the running posture may be triggered by other operations of the user. That is, the user may actually switch between seven different postures.

In one implementation, the client describes a posture switching manner of the operation control to the user according to beginner tutorials. In another possible implementation, to improve the playability of a game, the user grasps the posture switching manner of the operation control according to actual operations of the user in the game.

Figure 3:
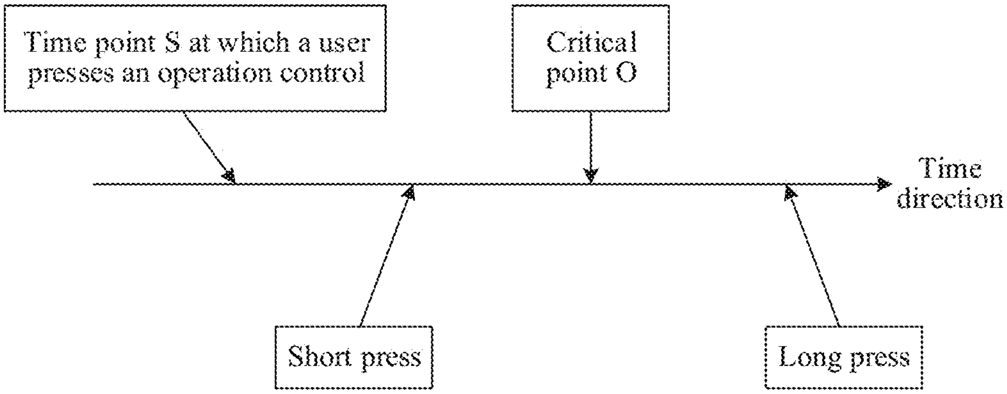
FIG. 3 is an exemplary schematic diagram of determining posture switching by using a touch duration.

For example, referring to FIG. 3, an arrow in FIG. 3 is a time direction. If the virtual object controlled by the user is in a standing posture, for an operation control, assuming that the client sets a critical point O of a touch duration for the operation control, when the user presses the operation control at a time point S and releases the operation control before the critical point O, the operation control is short-pressed, and the virtual object is switched from the standing posture to a squatting posture. Otherwise, the operation control is long-pressed, and the virtual object is switched from the standing posture to a prone posture.

Step 205: Switch the virtual object from the first posture to the second posture.

After determining the second posture of the virtual object, the client adjusts the UI to represent that the posture of the virtual object has been switched. In this embodiment of this application, after determining the second posture of the virtual object, the client may display in the UI, by adjusting a three-dimensional model of the virtual object and a viewing angle of a virtual camera in the virtual environment, a switching process of switching the virtual object from the first posture to the second posture. In some embodiments, the process is represented in an animation form.

Besides, after the virtual object switches a posture, an icon display of the operation control may also change in style. The operation control includes a posture icon. When the virtual object is switched from the first posture to the second posture, the posture icon is controlled to switch from a first display style to a second display style. The first display style and the second display style may be different in color or shape. This is not limited in the embodiments of this application. Through the switching of display styles, the user may be prompted that the virtual object controlled by the user has switched a posture and completed a response to the touch operation signal of the user.

Figure 4:
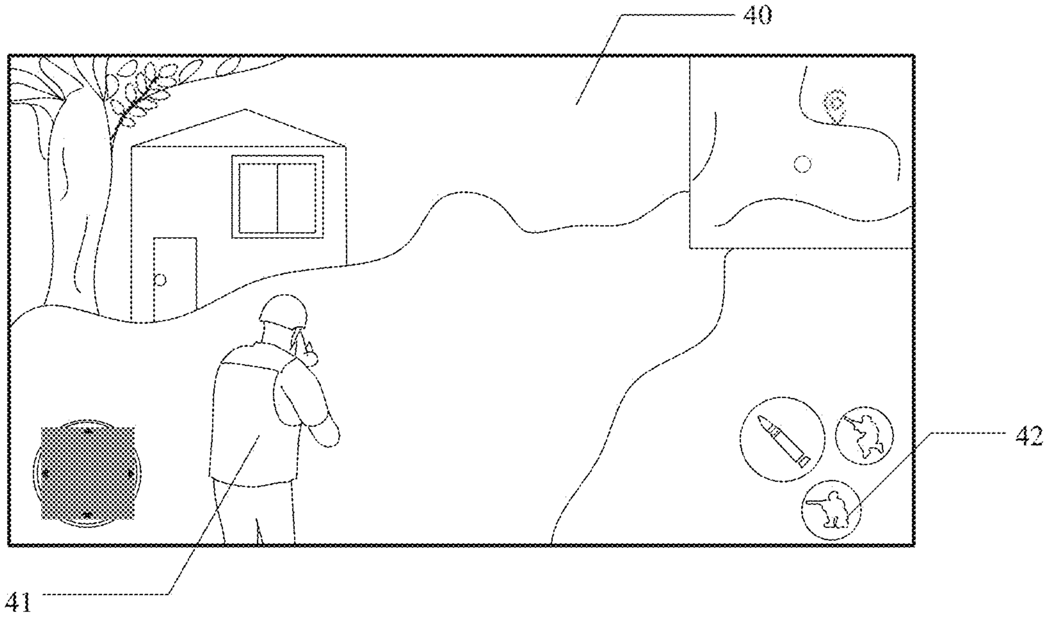
FIG. 4 is an exemplary schematic diagram of a UI of a standing posture of a virtual object.
Figure 5:
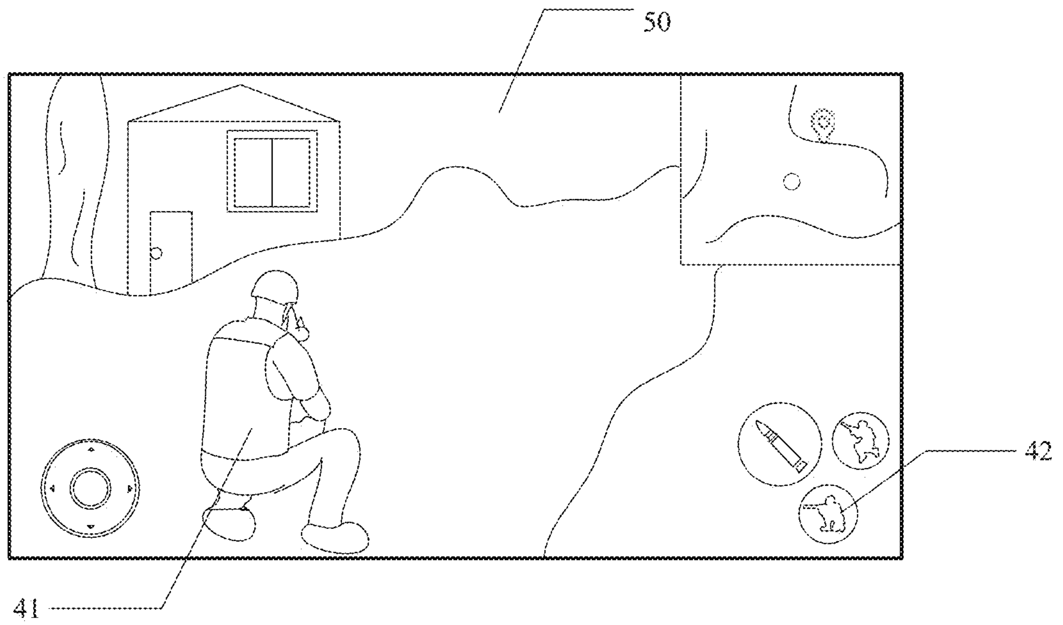
FIG. 5 is an exemplary schematic diagram of a UI of a squatting posture of a virtual object.
Figure 6:
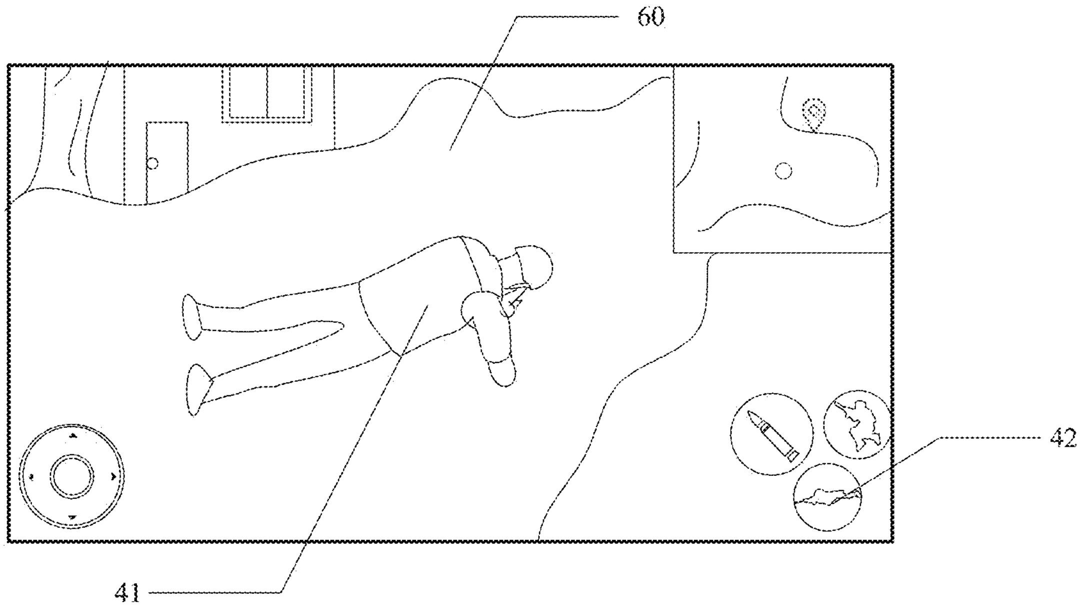
FIG. 6 is an exemplary schematic diagram of a UI of a prone posture of a virtual object.

Referring to FIG. 4, FIG. 5, and FIG. 6, a game APP of a third-person perspective as an example. UIs of three postures of the virtual object are described. As shown in FIG. 4, the client displays a UI 40. A first posture of a virtual object 41 is a standing posture, and a first display style of an operation control 42 is a gray icon representing squatting. It is assumed that the client determines a posture switching manner of the virtual object 41 by using a touch duration of a touch operation signal. When the user short presses the operation control 42 in FIG. 4, the client plays a posture switching animation. Further, as shown in FIG. 5, a second posture to which the virtual object 41 is to be switched is a squatting posture, and a second display style of the operation control 42 is a yellow-highlighted icon representing squatting. When the user long presses the operation control 42 in FIG. 4, the client plays a posture switching animation. Further, as shown in FIG. 6, a second posture to which the virtual object 41 is to be switched is a prone posture, and a second display style of the operation control 42 is a yellow-highlighted icon representing a prone state.

If the first posture of the virtual object is a running posture, after the user presses the operation control, the client plays a posture switching animation. Further, a second posture to which the virtual object is to be switched is a sliding tackle posture, and a second display style of the operation control is a red-highlighted icon representing squatting.

Figure 7:
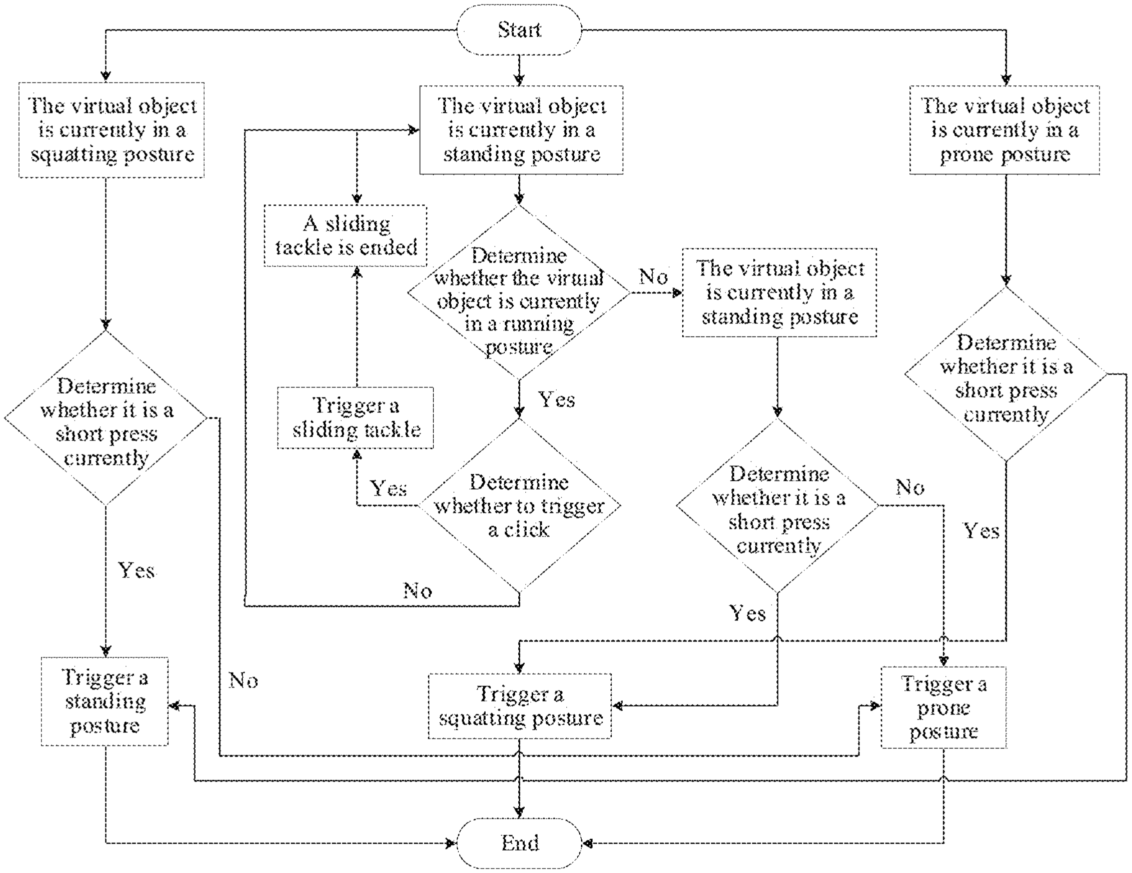
FIG. 7 is an exemplary flowchart of posture switching of a virtual object.

In addition, referring to FIG. 7, an example in which the client determines a posture switching manner of the virtual object according to a touch duration in the touch operation signal is used to completely describe this embodiment of this application. When the game is started, the client detects a current posture (that is, the first posture) of the virtual object. When the virtual object is in a standing posture, if the operation control is short pressed, the posture is triggered to switch to a squatting posture, and if the operation control is long pressed, the posture is triggered to switch to a prone posture. When the virtual object is in a squatting posture, if the operation control is short pressed, the posture is triggered to switch to a standing posture, and if the operation control is long pressed, the posture is triggered to switch to a prone posture. When the virtual object is in a prone posture, if the operation control is short pressed, the posture is triggered to switch to a squatting posture, and if the operation control is long pressed, the posture is triggered to switch to a standing posture. When the virtual object is in a running posture, if the operation control is short pressed or long pressed, the posture is triggered to switch to a sliding tackle posture, and the sliding tackle posture is automatically ended within a particular time range.

In summary, in the technical solutions provided in the embodiments of this application, a virtual object is controlled to switch between different postures through different operations on the same operation control, which removes the limitation that one operation control can only control switching of one posture in the related art at present, and implements switching of a plurality of postures by using one operation control, thereby helping to make a UI more concise and more user-friendly.

Figure 8:
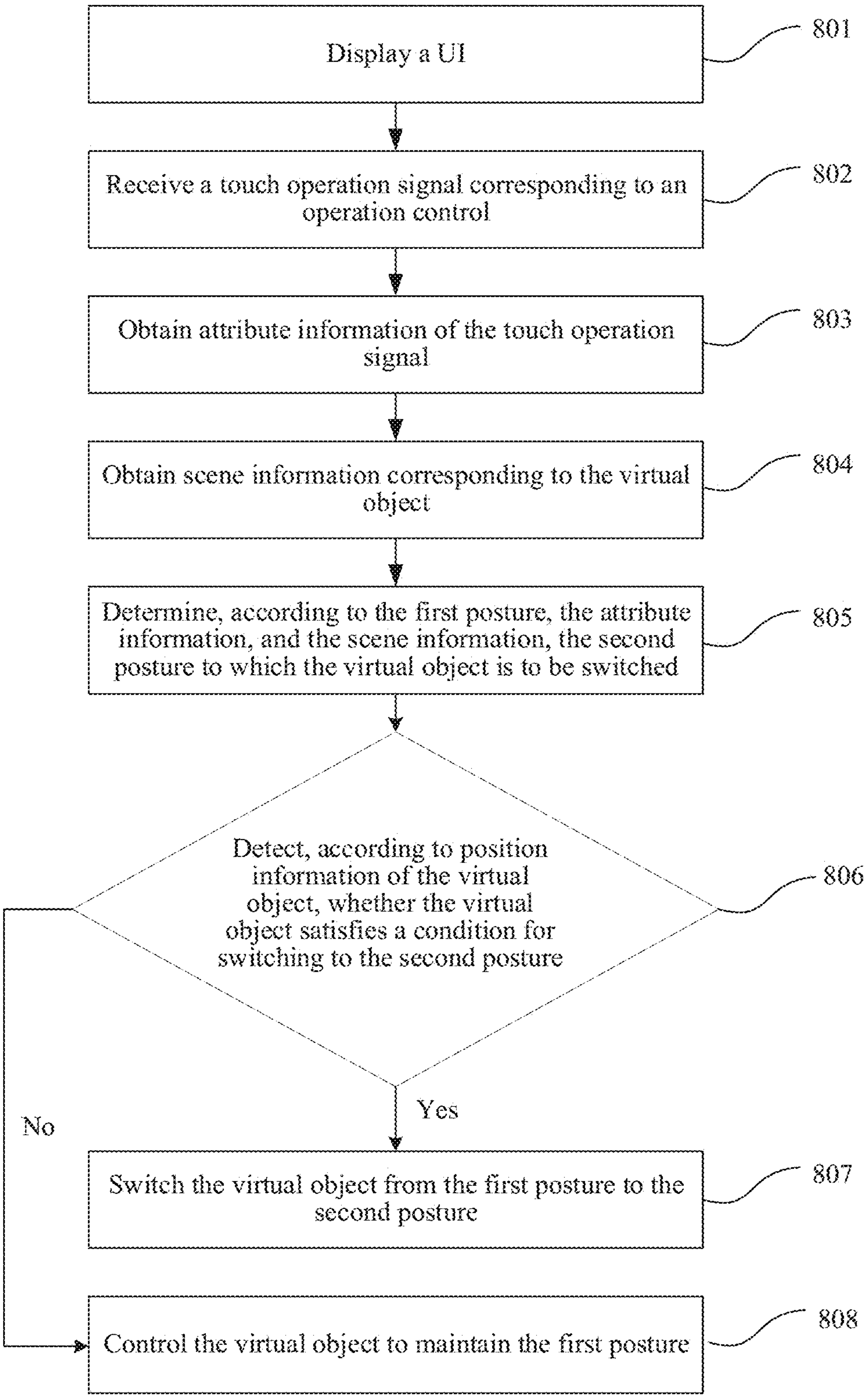
FIG. 8 is a flowchart of a virtual object control method according to another embodiment of this application.

FIG. 8 is a flowchart of a virtual object control method according to another embodiment of this application. The method may be applied to the mobile terminal 10 in the implementation environment shown in FIG. 1. For example, the steps may be performed by the client ("client" for short in the following) of the APP installed on the mobile terminal 10. The method may include the following steps (801 to 808):

Step 801: Display a UI.

Step 802: Receive a touch operation signal corresponding to an operation control.

Step 803: Obtain attribute information of the touch operation signal.

Step 801 to step 803 are the same as step 201 to step 203. Reference may be made to the embodiment in FIG. 2. Details are not described herein again.

Step 804: Obtain scene information corresponding to the virtual object.

A scene corresponding to the virtual object is a deeper division of the virtual environment, for example, a sky virtual scene, a water virtual scene, and a ground virtual scene. The scene information is used for indicating a virtual scene that the virtual object is in. In some embodiments, the client detects the scene information corresponding to the virtual object in real time.

Step 805: Determine, according to the first posture, the attribute information, and the scene information, the second posture to which the virtual object is to be switched.

In this embodiment of this application, optionally, different types of scene information correspond to different posture mapping relationships. A posture mapping relationship is that for the same operation on the same operation control, the client has different posture switching manners according to scene information of different virtual scenes.

In some embodiments, in the sky virtual scene, a posture mapping relationship corresponding to the scene information is as follows:

If the first posture of the virtual object is an upright descending posture, when the attribute information is first attribute information, it is determined that the second posture to which the virtual object is to be switched is a half-swooping descending posture, and when the attribute information is second attribute information, it is determined that the second posture to which the virtual object is to be switched is a fully-swooping descending posture.

If the first posture of the virtual object is a half-swooping descending posture, when the attribute information is first attribute information, it is determined that the second posture to which the virtual object is to be switched is an upright descending posture, and when the attribute information is second attribute information, it is determined that the second posture to which the virtual object is to be switched is a fully-swooping descending posture.

If the first posture of the virtual object is a fully-swooping upright descending posture, when the attribute information is first attribute information, it is determined that the second posture to which the virtual object is to be switched is a half-swooping descending posture, and when the attribute information is second attribute information, it is determined that the second posture to which the virtual object is to be switched is an upright descending posture.

In some embodiments, in the water virtual scene, a posture mapping relationship corresponding to the scene information is as follows:

If the first posture of the virtual object is a breaststroke posture, when the attribute information is first attribute information, it is determined that the second posture to which the virtual object is to be switched is a butterfly stroke posture, and when the attribute information is second attribute information, it is determined that the second posture to which the virtual object is to be switched is an artistic swimming posture.

If the first posture of the virtual object is a butterfly stroke posture, when the attribute information is first attribute information, it is determined that the second posture to which the virtual object is to be switched is a breaststroke posture, and when the attribute information is second attribute information, it is determined that the second posture to which the virtual object is to be switched is an artistic swimming posture.

If the first posture of the virtual object is an artistic swimming posture, when the attribute information is first attribute information, it is determined that the second posture to which the virtual object is to be switched is a butterfly stroke posture, and when the attribute information is second attribute information, it is determined that the second posture to which the virtual object is to be switched is a breaststroke posture.

In some embodiments, if the first posture of the virtual object is an above-water static posture, it is determined that the second posture to which the virtual object is to be switched is an underwater diving posture. That is, when the first posture is an above-water static posture, there is only one case of the second posture to which the virtual object may be switched. In some embodiments, when the first posture is an above-water static posture, to reduce a calculation amount of a server, the client may directly switch the virtual object to an underwater diving posture without detecting attribute information of the touch operation signal.

The first attribute information and the second attribute information are determined by the client as mutually exclusive information. A game APP is used as an example. If the client determines a posture switching manner by using a touch duration, the first attribute information is that the touch duration is less than a preset duration, and the second attribute information is that the touch duration is greater than the preset duration; or the first attribute information is that the touch duration is greater than a preset duration, and the second attribute information is that the touch duration is less than the preset duration.

A posture mapping relationship about scene information of the ground virtual scene has been described above, and details are not repeated herein.

In some embodiments, the foregoing step 805 further includes the following sub-steps:

1. Obtain a posture mapping relationship corresponding to the scene information from a posture mapping relationship library, the posture mapping relationship library including at least one posture mapping relationship, each posture mapping relationship corresponding to one type of scene information.
2. Determine, from the posture mapping relationship corresponding to the scene information, a posture that corresponds to the first posture and the attribute information as the second posture to which the virtual object is to be switched.

Step 806: Detect, according to position information of the virtual object, whether the virtual object satisfies a condition for switching to the second posture. Step 807 is performed if the condition is satisfied. Step 808 is performed if the condition is not satisfied.

In some embodiments, the position of the virtual object is represented in a coordinate form. Position information of a virtual object is related information of the position of the virtual object in a virtual scene. The position information of the virtual object includes at least one of the following: position coordinates of the virtual object, an angle of the ground on which the virtual object is located, and a distance between the virtual object and the nearest obstacle. When the virtual object is on a flat ground, the angle of the ground on which the virtual object is located is 0. After determining the second posture to which the virtual object is to be switched, the client obtains position information of the virtual scene in which the virtual object is located, and detects, in the position information, whether the virtual object satisfies the condition for switching to the second posture.

In this embodiment of this application, to make the game design more realistic, posture switching meets the common sense in real life, for example, body parts of virtual objects cannot pass through obstacles.

Figure 9:
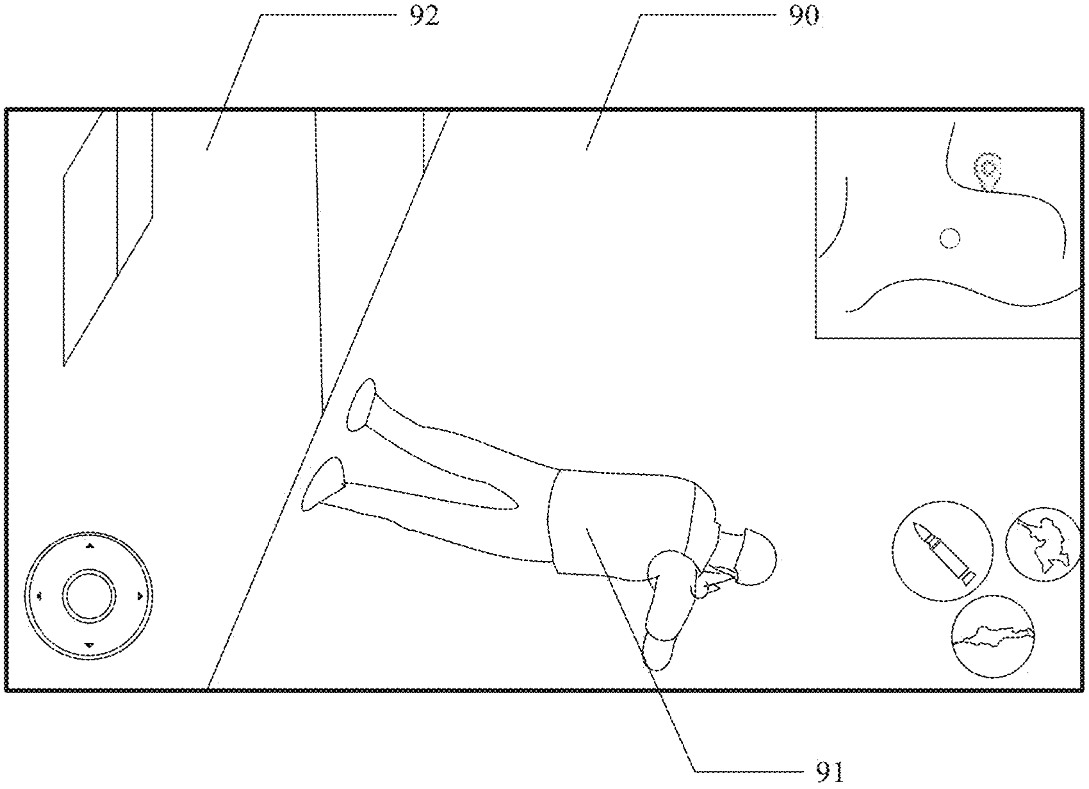
FIG. 9 is an exemplary schematic diagram of a UI of a condition for a virtual object to switch to a prone posture.

For example, referring to FIG. 9, the ground virtual scene is used as an example. The client displays a UI 90. When a distance condition between a virtual object 91 and a wall surface 92 is at least greater than or equal to a leg length of the virtual object 91, the virtual object 91 may switch from a standing posture to a prone posture. In some embodiments, the foregoing distance condition may be a specific value determined by the client, for example, 1.1 m, 1.2 m, or 1.3 m. This is not limited in the embodiments of this application.

Figure 10:
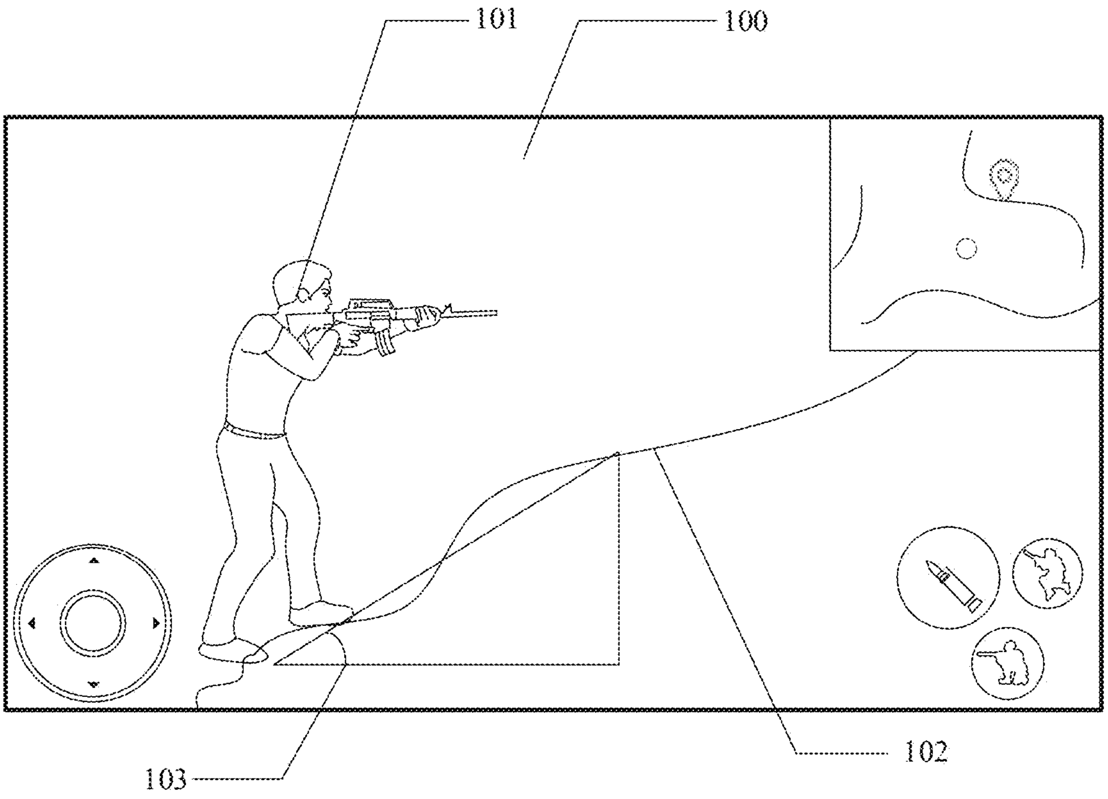
FIG. 10 is an exemplary schematic diagram of a UI of another condition for a virtual object to switch to a prone posture.

Certainly, the client may also set a switching condition for the second posture. As shown in FIG. 10, the client displays a UI 100, and a first posture of a virtual object 101 is a standing posture. When the virtual object 101 is on a slope 102 and when an angle 103 of the slope is less than or equal to a preset angle, the virtual object 101 may switch from a standing posture to a prone posture. In some embodiments, the preset angle is determined by the client, and may be 20°, 30°, or 40°. This is not limited in the embodiments of this application.

Step 807: Switch the virtual object from the first posture to the second posture.

Step 808: Control the virtual object to maintain the first posture.

In summary, the technical solution provided in this embodiment of this application is proposed to solve the technical issues described above by avoiding an over-crowed user interface with too many function buttons, which not only is error-prone when the wrong buttons are activated but also reduce the performance of the games and gaming systems. According to the embodiments of this application, one operation control is configured with multiple postures with different functions based on the current situation of the operation control and its context such that different virtual scenes correspond to different posture mapping relationships, thereby improving the playability and flexibility of a game, increasing the appeal of the game, reducing the limitations of operations, solving the problem of monotonous postures in the game, bringing better game experience to users, and improving the performance of the product.

The following is an apparatus embodiment of this application, which can be used to perform the method embodiments of this application. For details not disclosed in the apparatus embodiment of this application, reference may be made to the method embodiments of this application.

Figure 11:
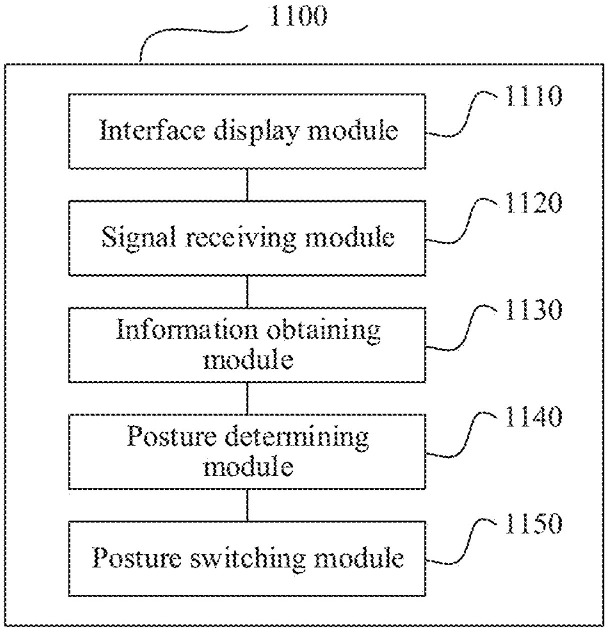
FIG. 11 is a block diagram of a virtual object control apparatus according to an embodiment of this application.

FIG. 11 is a block diagram of a virtual object control apparatus according to an embodiment of this application. The apparatus has functions of implementing the virtual object control method. The functions may be implemented by hardware, or may be implemented by hardware executing corresponding software. The apparatus may be the foregoing mobile terminal or disposed in the mobile terminal. An apparatus 1100 may include an interface display module 1110, a signal receiving module 1120, an information obtaining module 1130, a posture determining module 1140, and a posture switching module 1150.

The interface display module 1110 is configured to display a UI, the UI including an operation control configured to control a posture of a virtual object in a virtual environment, the operation control being configured to control the virtual object to switch between two different postures.

The signal receiving module 1120 is configured to receive a touch operation signal corresponding to the operation control.

The information obtaining module 1130 is configured to obtain attribute information of the touch operation signal.

The posture determining module 1140 is configured to determine, according to a first posture of the virtual object and the attribute information, a second posture to which the virtual object is to be switched.

The posture switching module 1150 is configured to control the virtual object to switch from the first posture to the second posture.

In an exemplary embodiment, the attribute information includes at least one of the following: a touch duration, a touch pressure, a quantity of times of touch, and a swipe direction.

In an exemplary embodiment, the posture switching module 1150 is further configured to display in the UI, by adjusting a three-dimensional model of the virtual object and a viewing angle of a virtual camera in the virtual environment, a switching process of switching the virtual object from the first posture to the second posture.

In an exemplary embodiment, the posture determining module 1140 is configured to:

when the first posture is a standing posture, determine the second posture as a squatting posture when the attribute information is first attribute information, and determine the second posture as a prone posture when the attribute information is second attribute information; and when the first posture is a squatting posture, determine the second posture as a standing posture when the attribute information is first attribute information, and determine the second posture as a prone posture when the attribute information is second attribute information; and when the first posture is a prone posture, determine the second posture as a squatting posture when the attribute information is first attribute information, and determine the second posture as a standing posture when the attribute information is second attribute information.

In an exemplary embodiment, the posture determining module 1140 is further configured to determine, when the first posture is a running posture, that the second posture to which the virtual object is to be switched is a sliding tackle posture.

Figure 12:
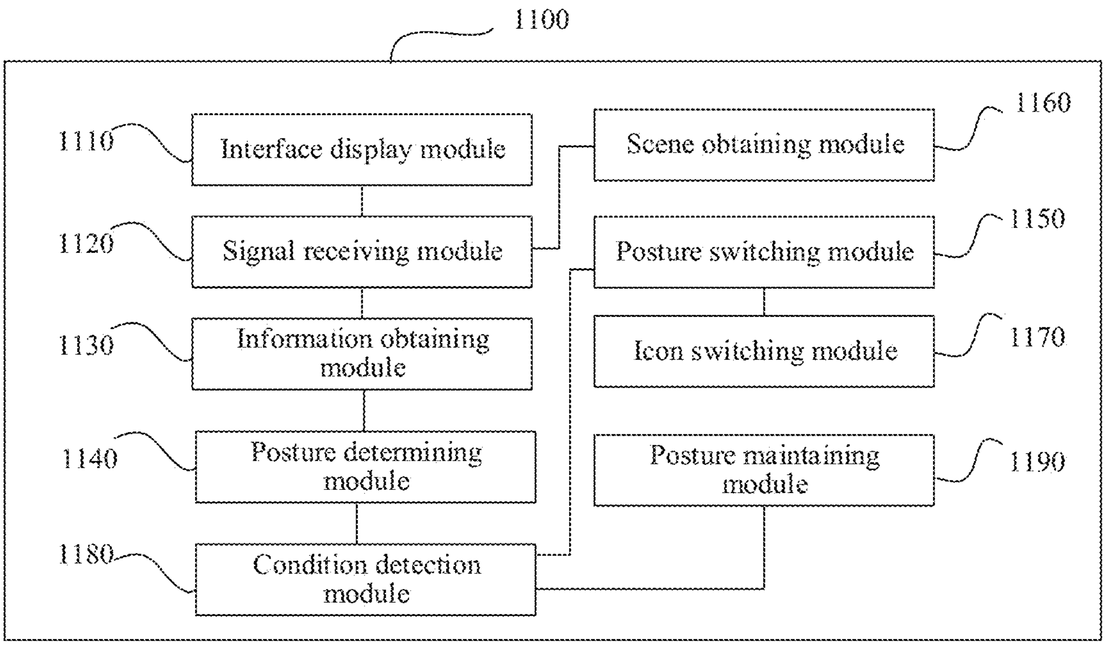
FIG. 12 is a block diagram of a virtual object control apparatus according to another embodiment of this application.

In an exemplary embodiment, as shown in FIG. 12, the apparatus 1100 further includes a scene obtaining module 1160.

The scene obtaining module 1160 is configured to obtain scene information corresponding to the virtual object, the scene information being used for indicating a virtual scene in which the virtual object is located.

The posture determining module 1140 is further configured to determine, according to the first posture, the attribute information, and the scene information, the second posture to which the virtual object is to be switched.

In an exemplary embodiment, the posture determining module 1140 is further configured to obtain a posture mapping relationship corresponding to the scene information from a posture mapping relationship library, the posture mapping relationship library including at least one posture mapping relationship, each posture mapping relationship corresponding to one type of scene information; and further configured to determine, from the posture mapping relationship corresponding to the scene information, a posture that corresponds to the first posture and the attribute information as the second posture to which the virtual object is to be switched.

In an exemplary embodiment, as shown in FIG. 12, the apparatus 1100 further includes an icon switching module 1170.

The icon switching module 1170 is configured to control, when the virtual object is switched from the first posture to the second posture, the posture icon to switch from a first display style to a second display style.

In an exemplary embodiment, as shown in FIG. 12, the apparatus 1100 further includes a condition detection module 1180 and a posture maintaining module 1190.

The condition detection module 1180 is configured to detect, according to position information of the virtual object, whether the virtual object satisfies a condition for switching to the second posture.

The posture switching module 1150 is further configured to perform, when the virtual object satisfies the condition for switching to the second posture, an operation of switching the virtual object from the first posture to the second posture.

The posture maintaining module 1190 is configured to control, when the virtual object does not satisfy the condition for switching to the second posture, the virtual object to maintain the first posture.

In summary, in the technical solutions provided in the embodiments of this application, a virtual object is controlled to switch between different postures through different operations on the same operation control, which removes the limitation that one operation control can only control switching of one posture in the related art at present, thereby making a UI more concise and the operation for the virtual object to switch between postures more convenient, improving the diversity of the game, increasing the playability of the game, and improving the performance of the product. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

When the apparatus provided in the foregoing embodiment implements its functions, a description is given only by using the foregoing division of function modules as an example. In actual applications, the functions may be allocated to and implemented by different function modules according to the requirements, that is, the internal structure of the device may be divided into different function modules, to implement all or some of the functions described above. In addition, the apparatus and method embodiments provided in the foregoing embodiments belong to the same conception. For the specific implementation process, refer to the method embodiments, so the details are not described herein again.

FIG. 12 is a structural block diagram of a computing device 1300 (e.g., a mobile terminal) according to an embodiment of this application. The computing device 1300 may be an electronic device, such as a mobile phone, a tablet computer, a game console, an ebook reader, a multimedia playback device, a wearable device, and a personal computer. The mobile terminal is configured to implement the virtual object control method provided in the foregoing embodiments. The mobile terminal may be the mobile terminal 10 in the implementation environment shown in FIG. 4. Specifically, the computing device 1300 includes a processor 1201 and a memory 1202:

The processor 1301 may include one or more processing cores. For example, the processor may be a 4-core processor or an 8-core processor. The processor 1301 may be implemented by using at least one hardware form of a digital signal processor (DSP), a field programmable gate array (FPGA), and a programmable logic array (PLA). The processor 1301 may alternatively include a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 1301. The GPU is configured to be responsible for rendering and drawing content to be displayed on a display screen. In some embodiments, the processor 1301 may further include an AI processor. The AI processor is configured to process computing operations related to machine learning.

The memory 1302 may include one or more computer-readable storage media. The computer-readable storage medium may be non-transient. The memory 1302 may further include a high-speed random access memory (RAM), and a non-volatile memory such as one or more magnetic disk storage devices or flash storage devices. In some embodiments, the non-transient computer-readable storage medium in the memory 1302 is configured to store at least one instruction, at least one program, a code set, or an instruction set, the at least one instruction, the at least one program, the code set, or the instruction set being configured to be executed by one or more processors to implement the virtual object control method In some embodiments, the computing device 1300 may optionally include a peripheral interface 1303 and at least one peripheral. The processor 1301, the memory 1302, and the peripheral interface 1303 may be connected by a bus or a signal cable. Each peripheral may be connected to the peripheral interface 1303 through a bus, a signal cable, or a circuit board. Specifically, the peripheral includes: at least one of a radio frequency (RF) circuit 1304, a display screen 1305, a camera component 1306, an audio circuit 1307, a positioning component 1308, and a power supply 1309.

Figure 13:
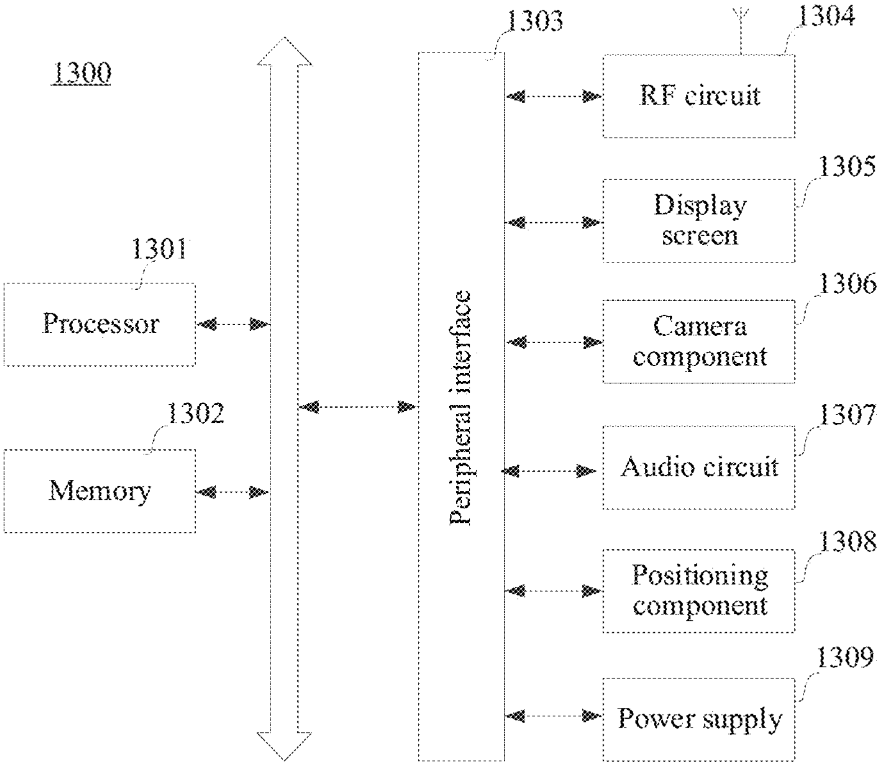
FIG. 13 is a structural block diagram of a computing device according to an embodiment of this application.

A person skilled in the art may understand that the structure shown in FIG. 13 does not constitute a limitation to the computing device 1300, and the mobile terminal may include more or fewer components than those shown in the figure, or some components may be combined, or a different component arrangement may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the virtual object control method.

In some embodiments, the computer-readable storage medium may include: a read-only memory (ROM), a RAM, a solid state drive (SSD), an optical disc, or the like. The RAM may include a resistive random access memory (ReRAM) and a dynamic RAM (DRAM).

An exemplary embodiment of this application further provides a storage medium, the storage medium being configured to store a computer program, the computer program being configured to perform the virtual object control method.

In an exemplary embodiment, a computer program product is further provided, the computer program product, when executed by a processor, being used for implementing the virtual object control method "A plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for controlling a virtual object in a virtual environment performed by a computing device, the method comprising:

displaying a user interface (UI), the UI comprising an operation control configured to control a virtual object to switch between different postures in a virtual environment, wherein the virtual object has a first posture as its current posture in the virtual environment and the operation control has a first display style;

receiving a touch operation signal corresponding to the operation control by a user of the computing device;

obtaining attribute information of the touch operation signal;

determining a second posture to which the virtual object is to be switched from the first posture of the virtual object according to a combination of the first posture, the first display style of the operation control and the first attribute information;

switching the virtual object from the first posture to the second posture; and changing the operation control from the first display style corresponding to the first posture to a second display style corresponding to the second posture.

2. The method according to claim 1, wherein the attribute information comprises at least one of the following: a touch duration, a touch pressure, a quantity of times of touch, and a swipe direction.

3. The method according to claim 1, wherein the determining a second posture to which the virtual object is to be switched from a first posture of the virtual object according to a combination of the first posture, the first display style of the operation control and the attribute information, comprises:

when the first posture is a standing posture and the first display style of the operation control is an icon representing squatting, determining the second posture as a squatting posture when the attribute information is first attribute information, and determining the second posture as a prone posture when the attribute information is second attribute information;

when the first posture is a squatting posture and the first display style of the operation control is an icon representing prone, determining the second posture as a standing posture when the attribute information is the first attribute information, and determining the second posture as a prone posture when the attribute information is the second attribute information; and when the first posture is a prone posture and the first display style of the operation control is an icon representing standing, determining the second posture as a squatting posture when the attribute information is the first attribute information, and determining the second posture as a standing posture when the attribute information is the second attribute information.

4. The method according to claim 1, wherein the method further comprises:

when the first posture is a running posture, determining that the second posture to which the virtual object is to be switched is a sliding tackle posture.

5. The method according to claim 1, wherein the method further comprises:

after receiving the touch operation signal corresponding to the operation control by the user of the computing device, obtaining scene information corresponding to the virtual object, the scene information being used for indicating a virtual scene in which the virtual object is located; and determining the second posture to which the virtual object is to be switched from the first posture according to the first posture, the attribute information, and the scene information.

6. The method according to claim 1, wherein the method further comprises:

after determining the second posture to which the virtual object is to be switched from the first posture of the virtual object according to the first posture and the attribute information:

detecting, according to position information of the virtual object, whether the virtual object satisfies a condition for switching to the second posture;

when the virtual object satisfies the condition for switching to the second posture, performing an operation of switching the virtual object from the first posture to the second posture; and when the virtual object does not satisfy the condition for switching to the second posture, controlling the virtual object to maintain the first posture.

7. The method according to claim 1, wherein the switching the virtual object from the first posture to the second posture comprises:

displaying, in the UI, by adjusting a three-dimensional model of the virtual object and a viewing angle of a virtual camera in the virtual environment, a process of switching the virtual object from the first posture to the second posture.

8. The method according to claim 1, wherein the method further comprises:

receiving a new touch operation signal corresponding to the operation control by the user of the computing device;

obtaining new attribute information of the new touch operation signal;

determining a third posture to which the virtual object is to be switched from the second posture of the virtual object according to a combination of the second posture and the new attribute information;

switching the virtual object from the second posture to the third posture; and changing the operation control from the second display style to a third display style corresponding to the third posture, wherein the first posture, the second posture and the third posture are different from each other.

9. A computing device, comprising a processor, a memory that is communicatively connected to the processor via a communication bus, and a plurality of computer programs stored in the memory that, when executed by the processor, cause the computing device to perform a plurality of operations including:

displaying a user interface (UI), the UI comprising an operation control configured to control a virtual object to switch between different postures in a virtual environment, wherein the virtual object has a first posture as its current posture in the virtual environment and the operation control has a first display style;

receiving a touch operation signal corresponding to the operation control by a user of the computing device;

obtaining attribute information of the touch operation signal;

determining a second posture to which the virtual object is to be switched from the first posture of the virtual object according to a combination of the first posture, the first display style of the operation control and the first attribute information;

switching the virtual object from the first posture to the second posture; and changing the operation control from a first display style corresponding to the first posture to a second display style corresponding to the second posture.

10. The computing device according to claim 9, wherein the attribute information comprises at least one of the following: a touch duration, a touch pressure, a quantity of times of touch, and a swipe direction.

11. The computing device according to claim 9, wherein the determining a second posture to which the virtual object is to be switched from a first posture of the virtual object according to a combination of the first posture, the first display style of the operation control and the attribute information, comprises:

when the first posture is a standing posture and the first display style of the operation control is an icon representing squatting, determining the second posture as a squatting posture when the attribute information is first attribute information, and determining the second posture as a prone posture when the attribute information is second attribute information;

when the first posture is a squatting posture and the first display style of the operation control is an icon representing prone, determining the second posture as a standing posture when the attribute information is the first attribute information, and determining the second posture as a prone posture when the attribute information is the second attribute information; and when the first posture is a prone posture and the first display style of the operation control is an icon representing standing, determining the second posture as a squatting posture when the attribute information is the first attribute information, and determining the second posture as a standing posture when the attribute information is the second attribute information.

12. The computing device according to claim 9, wherein the method further comprises:

when the first posture is a running posture, determining that the second posture to which the virtual object is to be switched is a sliding tackle posture.

13. The computing device according to claim 9, wherein the method further comprises:

after receiving the touch operation signal corresponding to the operation control by the user of the computing device, obtaining scene information corresponding to the virtual object, the scene information being used for indicating a virtual scene in which the virtual object is located; and determining the second posture to which the virtual object is to be switched from the first posture according to the first posture, the attribute information, and the scene information.

14. The computing device according to claim 9, wherein the method further comprises:

receiving a new touch operation signal corresponding to the operation control by the user of the computing device;

obtaining new attribute information of the new touch operation signal;

determining a third posture to which the virtual object is to be switched from the second posture of the virtual object according to a combination of the second posture and the new attribute information;

switching the virtual object from the second posture to the third posture; and changing the operation control from the second display style to a third display style corresponding to the third posture, wherein the first posture, the second posture and the third posture are different from each other.

15. The computing device according to claim 9, wherein the method further comprises:

after determining the second posture to which the virtual object is to be switched from the first posture of the virtual object according to the first posture and the attribute information:

detecting, according to position information of the virtual object, whether the virtual object satisfies a condition for switching to the second posture;

when the virtual object satisfies the condition for switching to the second posture, performing an operation of switching the virtual object from the first posture to the second posture; and when the virtual object does not satisfy the condition for switching to the second posture, controlling the virtual object to maintain the first posture.

16. The computing device according to claim 9, wherein the switching the virtual object from the first posture to the second posture comprises:

displaying, in the UI, by adjusting a three-dimensional model of the virtual object and a viewing angle of a virtual camera in the virtual environment, a process of switching the virtual object from the first posture to the second posture.

17. A non-transitory computer-readable storage medium storing a plurality of computer programs, the computer programs, when executed by a processor of a computing device, being configured to perform a plurality of operations including:

displaying a user interface (UI), the UI comprising an operation control configured to control a virtual object to switch between different postures in a virtual environment, wherein the virtual object has a first posture as its current posture in the virtual environment and the operation control has a first display style;

receiving a touch operation signal corresponding to the operation control by a user of the computing device;

obtaining attribute information of the touch operation signal;

determining a second posture to which the virtual object is to be switched from the first posture of the virtual object according to a combination of the first posture, the first display style of the operation control and the first attribute information;

switching the virtual object from the first posture to the second posture; and changing the operation control from the first display style corresponding to the first posture to a second display style corresponding to the second posture.

18. The non-transitory computer-readable storage medium according to claim 17, wherein the attribute information comprises at least one of the following: a touch duration, a touch pressure, a quantity of times of touch, and a swipe direction.

19. The non-transitory computer-readable storage medium according to claim 17, wherein the method further comprises:

after receiving the touch operation signal corresponding to the operation control by the user of the computing device, obtaining scene information corresponding to the virtual object, the scene information being used for indicating a virtual scene in which the virtual object is located; and determining the second posture to which the virtual object is to be switched from the first posture according to the first posture, the attribute information, and the scene information.

20. The non-transitory computer-readable storage medium according to claim 17, wherein the switching the virtual object from the first posture to the second posture comprises:

displaying, in the UI, by adjusting a three-dimensional model of the virtual object and a viewing angle of a virtual camera in the virtual environment, a process of switching the virtual object from the first posture to the second posture.

* * * * *